US008723072B2

(12) United States Patent
Yamaguchi et al.

(10) Patent No.: US 8,723,072 B2
(45) Date of Patent: May 13, 2014

(54) PLASMA CUTTER, AND PLASMA CUTTER POWER SUPPLY SYSTEM

(75) Inventors: Yoshihiro Yamaguchi, Nomi (JP); Takahiro Iriyama, Nomi (JP)

(73) Assignee: Komatsu Industries Corporation, Komatsu-shi (JP)

( * ) Notice: Subject to any disclaimer, the term of this patent is extended or adjusted under 35 U.S.C. 154(b) by 1328 days.

(21) Appl. No.: 11/907,838

(22) Filed: Oct. 18, 2007

(65) Prior Publication Data

US 2008/0093347 A1 Apr. 24, 2008

(30) Foreign Application Priority Data

Oct. 24, 2006 (JP) ................................ 2006-289052

(51) Int. Cl.
*B23K 10/00* (2006.01)

(52) U.S. Cl.
USPC ............ 219/121.54; 219/121.36; 219/121.39; 219/137 PS

(58) Field of Classification Search
USPC ............ 219/121.34, 121.36, 121.39, 121.48, 219/121.54, 130.4, 137 PS
See application file for complete search history.

(56) References Cited

U.S. PATENT DOCUMENTS

| | | | | |
|---|---|---|---|---|
| 5,189,277 | A * | 2/1993 | Boisvert et al. | 219/121.54 |
| 2003/0052106 | A1* | 3/2003 | Albrecht | 219/130.1 |
| 2003/0062351 | A1* | 4/2003 | Davidson et al. | 219/130.5 |
| 2004/0026391 | A1* | 2/2004 | Oberzaucher et al. | 219/130.1 |

FOREIGN PATENT DOCUMENTS

| | | |
|---|---|---|
| JP | A-05-245647 | 9/1993 |
| JP | 08-001350 | 9/1996 |

OTHER PUBLICATIONS

Office Action mailed on May 25, 2011 issued in the corresponding Japanese Patent Application No. 2006-289052 (English translation enclosed).

* cited by examiner

*Primary Examiner* — Brian Jennison
(74) *Attorney, Agent, or Firm* — Posz Law Group, PLC

(57) ABSTRACT

In a main circuit 11 of the plasma cutter power supply device 6, a plurality of DC power units 14-1, . . . 14-n of low capacity are connected in parallel on their DC output sides, and are connected to a plasma torch 20. Each power unit 14-1, . . . 14-n can operate asynchronously and independently from each other. The power supply control device 6 controls the number of power units to be operated, and the intensity of output electrical current at which each of them is to be operated, according to the cutting conditions (the nature of the material to be cut, its thickness, and the cutting speed) and according to the number of power units which can be operated. If some of the power units are faulty, the power supply control device 6 controls the cutting conditions which can be accepted, according to the number of normal power units.

6 Claims, 4 Drawing Sheets

PLASMA CUTTER, AND PLASMA CUTTER POWER SUPPLY SYSTEM

BACKGROUND OF THE INVENTION

1. Field of the Invention

The present invention relates to a plasma cutter which performs thermal cutting of an object to be cut such as a metallic plate or the like by emitting plasma ark, and to a plasma cutter power supply system for a plasma cutter.

2. Prior Art

A typical automatic plasma cutter comprises: a table upon which a piece of material to be cut, such as a steel plate or the like, is mounted; an XYZ drive system for driving a plasma torch with servo amps and servo motors or the like in X, Y, and Z directions; a plasma cutter power supply device for generating a plasma ark with a plasma torch; a gas supply device for supplying gas to the plasma torch to be ionized; a cooling water device for cooling a nozzle and an electrode included in the plasma torch; and an NC controller or the like for controlling the above described devices, according to a numerical control (NC) processing program, so as to emit a plasma ark from the plasma torch while moving the plasma torch relative to the material to be cut.

Furthermore, the plasma cutter power supply device typically comprises: an inverter; a main circuit which supplies electrical current for a plasma ark to the plasma torch, and having a DC constant current power supply circuit; a high frequency generation circuit for superimposing a high voltage for igniting a pilot arc between the electrode and the nozzle of the plasma torch upon the output voltage of the main circuit; a pilot circuit which applies the output voltage of the main circuit between the electrode and the nozzle during ignition of the pilot arc, and which thereafter performs changeover so as to apply this output voltage between the electrode and the material to be cut, so as to convert the pilot arc over to a main arc; and a power supply control device for controlling the main circuit, the high frequency circuit and the pilot circuit so as to ignite the pilot arc, and so as subsequently to keep the main arc sustained. It should be understood that the plasma cutter power supply device which comprises these elements is generally contained within a single chassis. While the electrical current of the main arc which is supplied from this type of plasma cutter power supply device varies according to the nature of the material to be cut and its thickness and the like, it may attain a high value such as several hundreds of amperes. Accordingly, it becomes necessary to provide a main circuit of high capacity.

In order to provide a power supply circuit of high capacity of this type, a technique is per se known of connecting a plurality of inverters or power modules of low capacity in parallel.

For example, there is per se known a power supply device for a welding machine which comprises a plurality of inverters of low capacity in parallel, with one among these inverters being taken as being a master while the others are slaves, and with all of these inverters being driven by a control signal from the master (for example, refer to Patent Document #1). Moreover, according to requirements, in such a power supply device, any one of the inverters can be set as the master. Furthermore, there is also per se known a power supply device for a plasma cutter in which, along with a control module, a plurality of power modules are stacked together so as to be removable (for example, refer to Patent Document #2).

With a power supply device as described in Patent Document #1, if a fault develops in one of the power units, then it will be sufficient to repair or to exchange this power unit. Moreover, it is possible to increase the electrical current capacity of such a power supply device by increasing the number of power units.

Patent Document #1: Japanese Laid-Open Patent Publication Heisei 8-1350.

Patent Document #2: U.S. Pat. No. 5,189,277.

SUMMARY OF THE INVENTION

However, in neither Patent Document #1 not Patent Document #2 is there any disclosure of any concrete technique in relation to control of the output electrical currents of the plurality of inverters or power modules. According to these prior art techniques, if a fault has developed in any one among the plurality of inverters or power modules, it becomes impossible for the power supply device to function in a normal manner, and there is a danger of the welding machine or plasma cutter becoming impossible to use.

An object of the present invention is, in a plasma cutter power supply device which includes a plurality of power units of low capacity in combination, to provide a novel technique for controlling the output electrical currents of the power units.

Another object of the present invention is to provide a technique according to which such a plasma cutter can continue to operate, even if a fault develops in one among the plurality of power units.

The plasma cutter according to a first aspect of the present invention includes: a plasma torch; a plasma cutter power supply device which includes a plurality of power units capable of supplying electrical current to the plasma torch in parallel; and a power supply control device which controls how many among the plurality of power units are to be operated, and/or the intensity of the output electrical current of each of the power units which is being operated. As conditions which determine the number of power units to be used, or the intensity of the output electrical current of each of the power units which is being operated, there may be cited cutting conditions such as, for example, the nature of the material which is being cut and its plate thickness and so on, but these are not intended to be limitative of the present invention. According to this plasma cutter, it is possible to operate the plurality of power units in the optimum mode (for example, with the optimum number of power units operating at the optimum output electrical currents), and furthermore, if the cutting conditions or other conditions change, then it is possible to perform flexible control so as to operate in some other mode which has now become optimum.

In a preferred embodiment, the power supply control device (12, 12A) includes a means for determining the intensity of electrical current required for the plasma torch according to cutting conditions (for example, the nature of the material to be cut and its plate thickness), and a means for determining, according to the intensity of required electrical current which has been determined, how many among the plurality of power units are to be operated, and/or the intensity of the output electrical current of each of the power units which is being operated. Due to this, it is possible to control the plurality of power units so as to supply the necessary electrical current to the plasma torch, as matched to the cutting conditions.

In another preferred embodiment, the power supply control device includes: a means for ascertaining how many among the plurality of power units are faulty, or how many can be operated; a means of determining how many among the plurality of power units are to be operated, according to the number of power units which are faulty, or can be operated, which has been ascertained; a means for determining the intensity of electrical current required for the plasma torch, according to the cutting conditions; and a means for determining the intensity of the output electrical current of each of the power units which is being operated, according to the number of power units to be operated which has been determined, and according to the intensity of required electrical current which has been determined. Due to this, it is possible to operate the plasma cutter even if one or more among the plurality of power units has developed an anomaly such as a fault or the like.

In another preferred embodiment, the power supply control device includes: a means for ascertaining how many among the plurality of power units are faulty, or how many can be operated; a means for deciding whether or not cutting can be executed, based upon the number of power units which are faulty, or can be operated, which has been ascertained, and upon the cutting conditions; and a means for canceling execution of cutting, if it has been decided that it is not possible to execute cutting. Due to this, if one or more among the plurality of power units has developed an anomaly such as a fault or the like, and if cutting is requested under cutting conditions which require a large electrical current which the remaining properly functioning power units are unable to supply, then it is possible to refuse this request automatically.

In another preferred embodiment, each of the plurality of power units is capable of operating asynchronously and independently of the other the power units. Due to this the control becomes simple, since the plurality of power units are operating asynchronously. As one example of such a structure in which it is made to be possible for each of the power units to operate asynchronously and independently of the other the power units, each of the power units may, for example, employ a structure including an inverter and a rectifier on the output side thereof, and may have its DC output terminals connected in parallel with those of the other power units and with the plasma torch. With this structure, it is not necessary to drive the inverter of each of the power units in synchrony with those of the other power units.

In another preferred embodiment, this plasma cutter includes a plurality of plasma torches and a splitter which allocates the output electrical current of the plurality of power units between the plurality of plasma torches; and the power supply control device controls the intensity of the electrical current allocated by the splitter to each of the plurality of plasma torches, according to the cutting conditions for that plasma torch. Due to this, it is possible to supply the required electrical current from the plurality of power units to the plurality of plasma torches, according to the cutting conditions of each of the plasma torches.

In another preferred embodiment, this plasma cutter includes a plurality of plasma torches, a plurality of ignition circuits, and a splitter which allocates the plurality of ignition circuits to the plurality of power units. Due to this, it is simple and easy to ignite the plurality of plasma torches asynchronously, and moreover, even if some among the plurality of ignition circuits should develop a fault, it is possible to ignite any one of the plasma torches by using one of the ignition circuits which is still functioning properly.

In another preferred embodiment, the plasma cutter power supply device is divided into several units, and is contained within a main body of the plasma cutter. Due to this, space is no longer required for installing the plasma cutter power supply device separately from the main body of the plasma cutter, so that useless waste of working space in the workplace is reduced.

And, according to another aspect of the present invention, a plasma cutter power supply system includes a plasma cutter power supply device which includes a plurality of power units capable of supplying electrical current to a plasma torch in parallel, and a power supply control device which controls how many among the plurality of power units are to be operated, and/or the intensity of the output electrical current of each of the power units which is being operated, according to cutting conditions.

DESCRIPTION OF THE PREFERRED EMBODIMENTS

Figure 1:
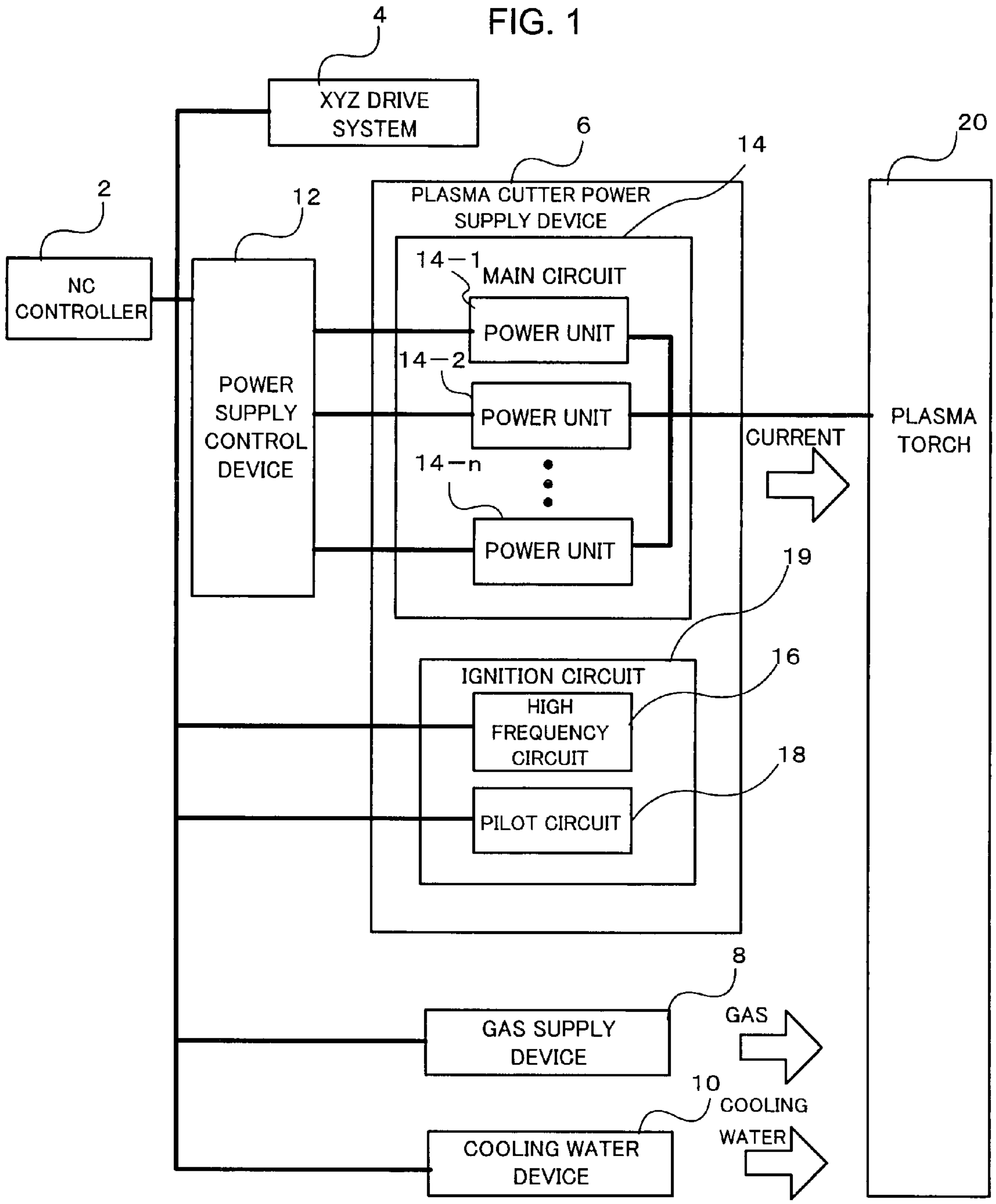
FIG. 1 is a block diagram showing the structure of the principal portions of a plasma cutter according to a first embodiment of the present invention.

In the following, several embodiments of the plasma cutter according to the present invention will be described in detail. FIG. 1 is a block diagram showing the structure of the principal portions of a plasma cutter according to a first embodiment of the present invention.

As shown in FIG. 1, this plasma cutter comprises: a plasma torch 20; a table (not shown in the figures) upon which the material to be cut is mounted; an NC controller 2 for controlling the various devices described below, so as to emit a plasma ark from the plasma torch 20 while moving the plasma torch 20 relatively to the material to be cut according to a numerical control (NC) processing program; an XYZ drive system for driving the plasma torch 20 in X, Y, and Z directions with servo amps and servo motors or the like; a plasma cutter power supply device 6 which supplies a plasma electrical current to the plasma torch 20 for generating a plasma ark; a gas supply device 8 for supplying the plasma gas and an assist gas to the plasma torch 20; a cooling water device 10 which supplies cooling water to the plasma torch 20 for cooling its nozzle and its electrode; and a power supply control device 12 which performs control of the plasma cutter power supply device 6. It should be understood that it would be acceptable for this power supply control device 12 to be housed internally to the NC controller 2; or, alternatively, it would also be acceptable for the power supply control device 12 to be housed internally to the plasma cutter power supply device 6.

The plasma cutter power supply device 6 comprises a main circuit 14 which supplies an electrical current for generating and maintaining a plasma ark to the plasma torch 20, and an ignition circuit 19 for igniting a plasma ark (a pilot arc) between an electrode within the plasma torch 20 (not shown in the drawings) and a nozzle (not shown either) and then for converting this pilot arc to a plasma ark (a main arc) between the electrode and the material to be cut (also not shown in the drawings). This ignition circuit 19 comprises a high frequency circuit 16 for superimposing a high voltage for igniting the pilot arc upon the output voltage of the main circuit 14, and a pilot circuit 18 which applies the output voltage of the main circuit 14, upon which the above described high voltage is superimposed during pilot arc ignition, between the electrode within the plasma torch 20 and the nozzle, and thereafter performs changeover so as to apply the output voltage of the main circuit 14 between the electrode and the material to be cut, in order to convert the pilot arc to over to the main arc.

The main circuit 14 comprises a plurality of power units 14-1, 14-2, . . . 14-n, and these power units 14-1, 14-2, . . . 14-n are connected together in parallel at their output sides. Each of this power units 14-1, 14-2, . . . 14-n is a DC constant current power supply circuit which comprises, for example, an input side rectifier, an inverter, a transformer and an output side rectifier connected in series in that order, with the DC output terminals of the output side rectifier being connected to those of the other power units in parallel, and moreover with them all being connected in common to the plasma torch 20. By connecting together the DC output terminals of the output rectifiers in parallel, each of the power units 14-1, 14-2, . . . 14-n is able to supply electrical current to the plasma torch 20, independently of and asynchronously with respect to the other power units. Accordingly, even if one or more of the power units develops a fault, it is possible to supply electrical current to the plasma torch 20 in a normal manner from the other power units. Moreover, it is not necessary for the inverter of each of the various power units 14-1, 14-2, . . . 14-n to perform synchronized operation with the inverters of the other power units, so that it is not necessary to connect the inverters together with synchronization signal lines as disclosed in Patent Document #1 (Japanese Laid-Open Patent Publication Heisei 8-1350). The output electrical current of each of the power units 14-1, 14-2, . . . 14-n is variable, and its maximum value (i.e. the electrical current capacity of that power unit) may be, for example, 100 A. Thus, the maximum value of the output electrical current of the main circuit 14 (i.e. its electrical current capacity) which includes this plurality of n power units 14-1, 14-2, . . . 14-n is 100 A×n. For example, if the number n of power units is 3, then the electrical current capacity of the main circuit 14 is 300 A. And, if one among these three power units develops a fault and stops operating, then, although the electrical current capacity of the main circuit 14 drops to 200 A, it is still possible to continue operation of the plasma torch within the 200 A region.

In order to realize this advantage, the power supply control device 12 is adapted to transmit a control signal to each of the power units 14-1, 14-2, . . . 14-n, and to be able to drive and control each of the power units 14-1, 14-2, . . . 14-n independently from the others. For example, the power supply control device 12 is able to transmit control signals only to certain desired ones among the plurality of power units 14-1, 14-2, . . . 14-n (for example, to the first power unit 14-1 and the second power unit 14-2), so as only to drive these power units 14-1 and 14-2, while stopping the operation of the other power units 14-3 . . . 14-n. Moreover, if a fault has developed with one or more of the power units (for example, the first power unit 14-1), then the power supply control device 12 is also able directly to stop sending a control signal to that power unit 14-1 which has failed, while maintaining the driving of the other power units 14-2 . . . 14-n which are still in good order; or, alternatively, when one or more of the power units stops operating, it may start one or more other non-faulty power units which up until the present time were not operating. Furthermore, this power supply device 12 is also capable of increasing or decreasing the output electrical current of each of the power units 14-1, 14-2, . . . 14-n, so that it can make the output electrical currents of the plurality of power units 14-1, 14-2, . . . 14-n either be different from one another, or be the same as one another. Moreover, as will be explained in greater detail hereinafter, this power supply control device 12 is also capable of adjusting the output electrical currents of the plurality of power units 14-1, 14-2, . . . 14-n or the number of power units which are driven according to the nature of the material to be cut or according to its thickness as commanded by the NC processing program, thereby controlling the electrical current which is supplied to the plasma torch 20 to an optimum value, or the power supply control device 12 is capable of selecting the nature of the process material which is to be cut and its thickness (i.e. the NC processing program which can be executed) according to the maximum value of the electrical current which can be supplied from the plurality of power units 14-1, 14-2, . . . 14-n (i.e. their electrical current capacities) (or according to the number of power units which are functioning normally, or the number of power units in which faults have developed.

In order to be able to perform this kind of control of the plurality of power units 14-1, 14-2, . . . 14-n, the power supply control device 12 is endowed with a function of determining the intensity of the plasma electrical current which is required for supply to the plasma torch 20 according to the cutting conditions such as the nature of the material to be cut and its plate thickness and the like, with a function of determining how many of the power units are functioning in order to supply this required plasma electrical current, with a function of subdividing the intensity of the above described required plasma electrical current between the various power units which are actually functioning, with a function of commanding each of these power units to provide an electrical current of the intensity which has thus been allocated to that power unit by subdivision of the above total power requirement, with a function of ascertaining the actual value of the output electrical current of each of the power units, with a function of detecting any anomaly in each of the power units such as the occurrence of a fault or the like, and so on.

Moreover, in the same manner as in the prior art, this power supply control device 12 also is endowed with a function of controlling the ignition circuit 19 which comprises the high frequency generation circuit 16 and the pilot circuit 18, thus generating a pilot arc in the plasma torch 20, and with a function of subsequently performing the transition from the pilot arc to the main arc.

It should be understood that since, in the case of the plasma cutter according to the first embodiment of the present invention shown in FIG. 1, only one plasma torch 20 is incorporated, accordingly also only one ignition circuit 19 comprising a high frequency circuit 16 and a pilot circuit 18 is incorporated. By contrast, any suitable number of power units may be incorporated within the main circuit 14, according to the electrical current capacity which is desired; this number of power units bears no relation to the number of plasma torches 20.

Figure 2:
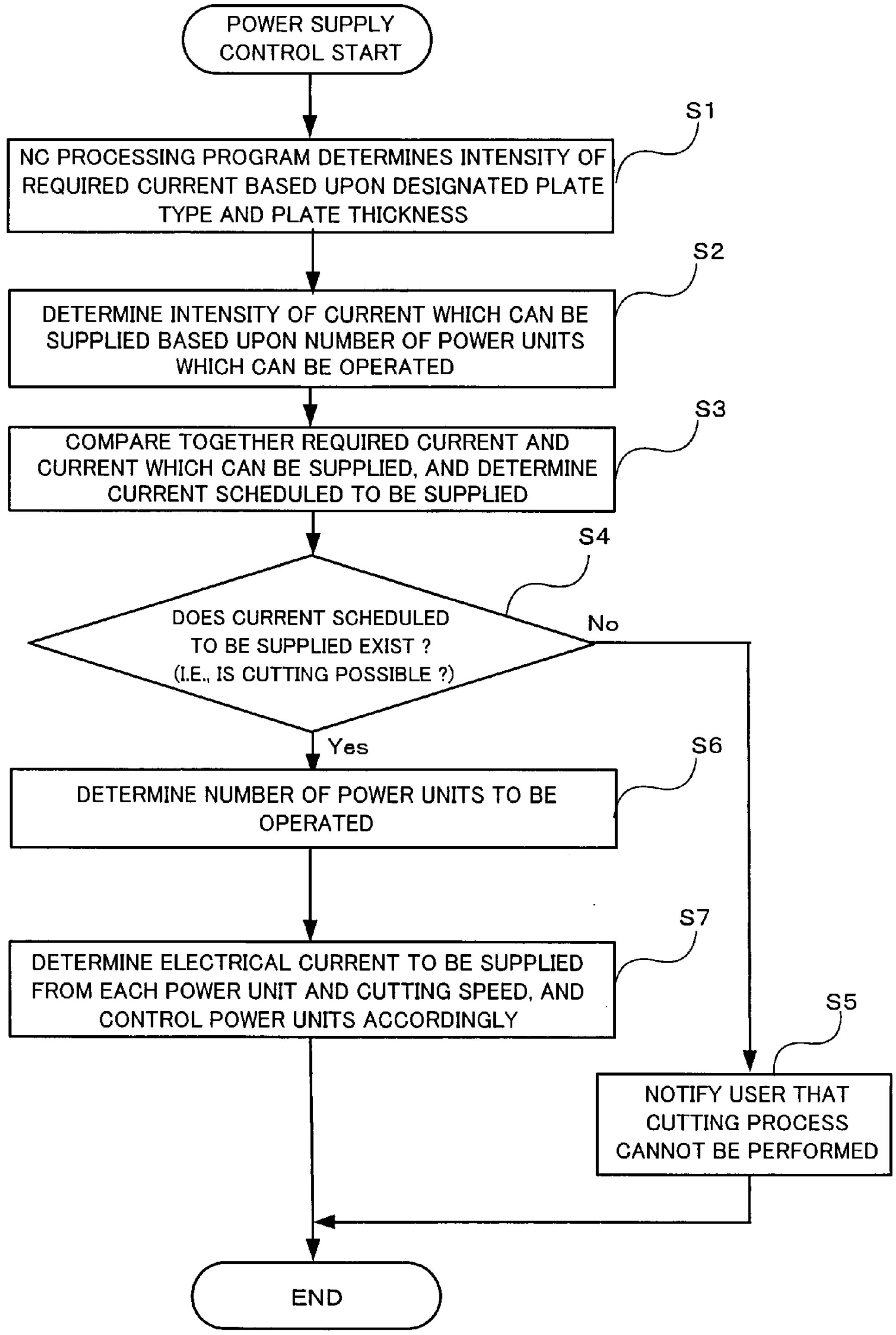
FIG. 2 is a flow chart showing the flow of processing while the plasma cutter shown in FIG. 1 is cutting a workpiece.

Next, the operation of the plasma cutter shown in FIG. 1, and particularly the operation which the power supply control device 12 performs to control the plurality of power units 14-1, 14-2, . . . 14-n, will be explained with reference to the flow chart shown in FIG. 2 and the characteristic diagram shown in FIG. 3.

Figure 3:
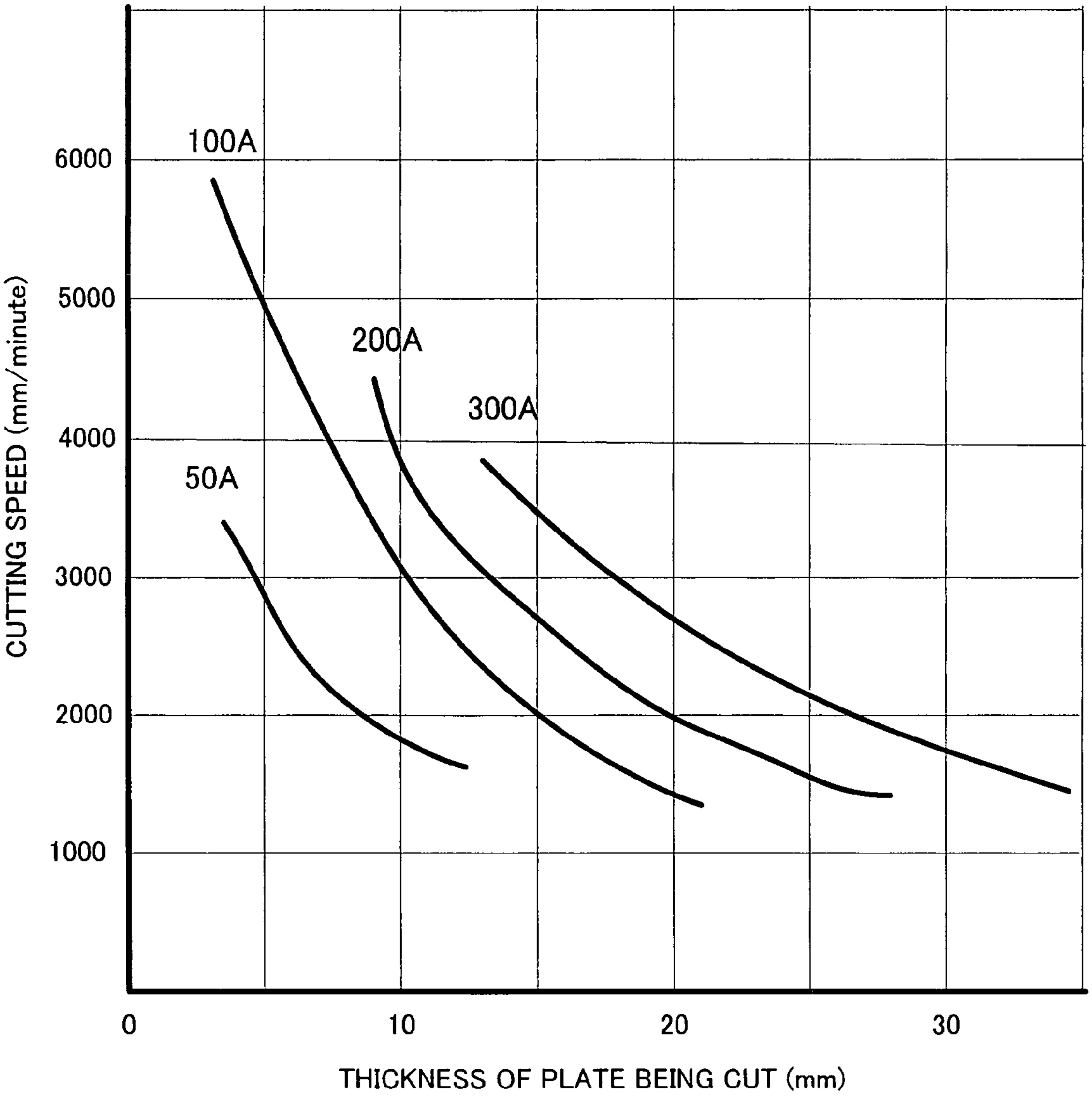
FIG. 3 is a characteristic figure showing the relationship, when cutting mild steel with an oxygen plasma, between the thickness of a plate which is being cut and the cutting speed.

In FIG. 3 there is shown the relationship, when cutting a mild steel plate with oxygen plasma using the plasma cutter according to this embodiment, between the thickness of the mild steel plate and the cutting speed, with the plasma electrical current as a parameter. The plate thickness (in mm) is shown along the horizontal axis, while the cutting speed (in mm/minute) is shown along the vertical axis. For example, when the plate thickness is 10 mm, it will be understood that: at a plasma electrical current of 200 A, a cutting speed of about 4000 mm/minute is suitable; at a plasma electrical current of 100 A, a cutting speed of about 3000 mm/minute is suitable; and, otherwise, a plasma electrical current of 300 A is not necessary. Moreover, when the thickness of the mild steel plate is 20 mm: at a plasma electrical current of 300 A, a cutting speed of about 2500 mm/minute is suitable; at a plasma electrical current of 200 A, a cutting speed of about 2000 mm/minute is suitable; and, at a plasma electrical current of 100 A, a cutting speed of about 1500 mm/minute is suitable. Furthermore, when the thickness of the mild steel plate is 30 mm, at a plasma electrical current of 300 A, a cutting speed of about 2000 mm/minute is suitable, but at a current of 200 A or less, cutting is difficult. A plasma electrical current of 100 A is suitable for a range of plate thickness from about 3 mm to about 20 mm; a plasma electrical current of 200 A is suitable for a range of plate thickness from about 8 mm to about 27 mm; and a plasma electrical current of 300 A is suitable for a range of plate thickness from about 13 mm to about 35 mm. These characteristics differ according to the nature of the material to be cut. Data or a program in which characteristics of this type are defined for different kinds of material is registered in advance in the power supply device 12 or in the NC controller 2.

In the following, the flow of the control procedure performed by the power supply control device 12 will be explained with reference to the flow chart of FIG. 2, with reference to FIG. 3 as required.

First, in a step S1, based upon the cutting conditions which have been commanded (i.e. upon the nature of the material to be cut and the plate thickness thereof), the NC processing program which has been set up in the NC controller 2 determines the intensity of the plasma electrical current (hereinafter simply termed the "current") which is required for cutting (i.e. the minimum value of the current which can be utilized, or the range thereof). For example, if the type of material which is to be cut is specified as being mild steel, then, as shown in FIG. 3, the intensity of the required current is determined so that: when the designated plate thickness is 10 mm, the current which can be utilized is from 50 A to 200 A; when the designated plate thickness is 20 mm, the current is from 200 A to 300 A; and, when the designated plate thickness is 30 mm, the current is 300 A.

Next, in a step S2, the maximum number of power units which can be operated is ascertained from the total number of power units which are mounted and the number of power units which are currently ascertained as being faulty; and the intensity of the electrical current (i.e. the maximum current value or the current range) which can be supplied is determined based upon this maximum number of units which can be operated. For example, with a total number of three power units being mounted and the electrical current capacity of each of them being 100 A, if one among these three power units is faulty, then a maximum of two power units can be operated, and the intensity of the electrical current which can be supplied is determined as being less than or equal to 200 A. On the other hand, if all of the three units can be operated, then the intensity of the electrical current which can be supplied is determined as being less than or equal to 300 A.

And, in a step S3, the intensity of the required electrical current which was determined in the step S1 and the intensity of the electrical current which can be supplied which was determined in the step S2 are compared together, and the common current intensity between these two is determined as being the value of electrical current which is scheduled to be supplied. For example: if the value of electrical current which can be supplied is less than or equal to 200 A, and the thickness of the mild steel plate to be cut is 5 mm, then the value of electrical current which is scheduled to be supplied is the range from 50 A to 100 A; if the plate thickness is 10 mm then the value of electrical current which is scheduled to be supplied is determined as being the range from 100 A to 200 A; if the plate thickness is 20 mm then the value of electrical current which is scheduled to be supplied is determined as being 200 A; and if the plate thickness is 30 mm then it is determined that the value of electrical current which is scheduled to be supplied is "none" (i.e. that cutting is not possible).

Next, in a step S4, a decision is made as to whether or not the value of electrical current which is scheduled to be supplied exists or not (or, to put it in another manner, whether or not the intensity of the electrical current which can be supplied is greater than or equal to the intensity of the required electrical current, i.e. whether or not cutting is possible). Here if the current scheduled to be supplied does not exist, as in the case when, in the example described above, the plate thickness is 30 mm, (the NO case in the step S4), then in a step S5 the operator is notified of the error that cutting is not possible, and cutting is not performed.

On the other hand if in the step S4 it is determined that the current scheduled to be supplied does exist, as if the plate thickness is 10 mm or 20 mm in the example described above (the YES case in the step S4), then in a step S6 the number of power units to be operated is determined, in a range less than or equal to the maximum number of power units which can be operated, so as to be able to supply the current scheduled to be supplied. For example, if the maximum number of power units which can be operated is two and the thickness of the mild steel plate is 5 mm, then since, as described above, the value of electrical current which is scheduled to be supplied is the range from 50 A to 100 A, accordingly it is possible to determine that the number of power units to be operated is one; while, if the plate thickness is 10 mm, then since the value of electrical current which is scheduled to be supplied is the range from 100 A to 200 A, accordingly it is possible to determine that the number of power units to be operated is two. It should be understood that it would also be acceptable, even if it is possible to supply the value of electrical current which is scheduled to be supplied with some number of power units, to arrange to determine the number of power units to be operated as being a greater number, thus allowing some margin. Or, for example when the value of electrical current which is scheduled to be supplied is the range from 100 A to 200 A, if the number of power units which are required for supplying such a value of electrical current changes according to what electrical current value is to be employed within this range, i.e. according to what level of processing speed is required for the processing, then it would be acceptable to arrange to select a smaller number of units to be operated if the processing speed required is low speed, while arranging to select a larger number of units to be operated if the processing speed required is high speed; and it would also be acceptable to determine the number of power units to be operated so that it changes according to the cutting speed, in consideration of the fact that the cutting speed sometimes changes (for example, the speed of cutting the straight line portions of the cutting line may be higher than the speed of cutting its corner portions). For example if, with the number of power units which can be operated being two, the thickness of the mild steel plate is 10 mm, then it would be acceptable to arrange to determine the number of power units to be operated as being one, so as to be able to supply a maximum of 100 A with the cutting speed being less than or equal to 3000 mm/minute; or to determine the number of power units to be operated as being two, so as to be able to supply a maximum of 200 A so that the cutting speed can be less than or equal to 3800 mm/minute; or to determine the number of power units to be operated as being either one or two, so that the cutting speed can be varied between 3000 mm/minute and 3800 mm/minute.

Generally, if the number of power units to be operated is determined so that the electrical current which is scheduled to be supplied is obtained by all of the power units which are operating outputting their maximum rated electrical currents, then a high efficiency will be obtained, since a power unit is designed so as to attain its maximum efficiency when it is outputting its maximum rated electrical current. On the other hand, to consider another aspect of the situation, if the number of power units which are actually operated in order to supply the current which is scheduled to be supplied is greater than the minimum number of power units which needs to be operated in order to supply that current, then, even if one among all of the power units which are operating becomes faulty partway through performing cutting, it is still possible to continue cutting since it is possible to continue supplying the required electrical current with the number of power units which remains, accordingly.

Next, in a step S7, the output electrical current of each of the power units which is to be operated and the cutting speed for the workpiece are determined, the operation of each of these power units is started, a command value for output electrical current is supplied to each of the power units and control is exerted so that the actual output electrical current and this commanded value agree with one another, and this control is continued until the cutting process has been completed. For example, if a plate of mild steel of thickness 10 mm is to be cut at a cutting speed of 3000 mm/minute, then, since as shown in FIG. 3 an electrical current of 100 A is required, if one power unit is to be used then control is performed by supplying a command value of 100 A to that power unit, while if two power units are to be used then control is performed by supplying a command value of half of that rated value, i.e. of 50 A, to each of those two power units. Furthermore, if a plate of mild steel of thickness 10 mm is to be cut at a cutting speed of 3800 mm/minute, then, since as shown in FIG. 3 an electrical current of 200 A is required, if two power units are to be used then control is performed by supplying a command value of 100 A to each of those two power units, while if three power units are to be used then control is performed by supplying a command value of ⅔ of that rated value, i.e. of approximately 70 A, to each of those three power units. And the actual values of the output electrical currents of the power units which are being operated are ascertained simultaneously, and, by comparing these with the respective command values, it is ascertained whether or not a fault has developed in each of the power units; and, if an anomaly does occur, the number of power units being operated is changed and the control specified by the step S2 described above and the subsequent steps is repeated, so that the operation of the plasma cutter may be continued.

Next, a plasma cutter according to a second embodiment of the present invention will be explained.

Figure 4:
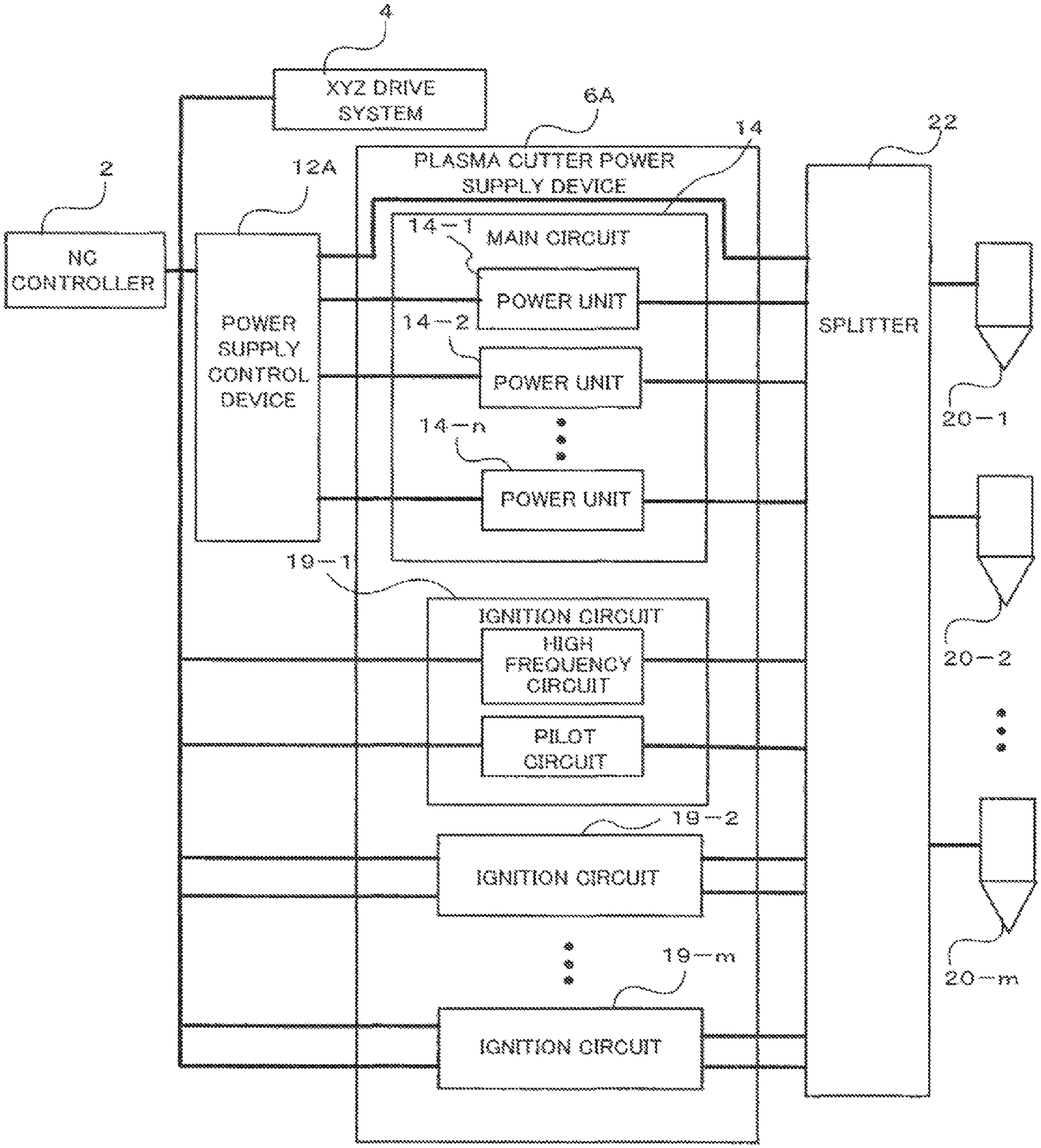
FIG. 4 is a block diagram showing the structure of the principal portions of a plasma cutter according to a second embodiment of the present invention.

FIG. 4 is a block diagram showing the structure of the principal portions of a plasma cutter according to this second embodiment of the present invention.

One aspect in which this plasma cutter according to the second embodiment of the present invention shown in FIG. 4 differs from that of the first embodiment shown in FIG. 1 is that it comprises a plurality (m) of plasma torches 20-1, 20-2, . . . 20-m, and, in the plasma cutter power supply device 6A, the output electrical currents of the plurality of power units 14-1, 14-2, . . . 14-n which are provided in parallel are allocated via a splitter 22 between the plurality of plasma torches 20-1, 20-2, . . . 20-m. Furthermore, a plurality (m) of ignition circuits 19-1, 19-2, . . . 19-m are allocated via the splitter 22 between the plurality of plasma torches 20-1, 20-2, . . . 20-m. The structure of each of these ignition circuits 19-1, 19-2, . . . 19-m is the same as that of the ignition circuit 19 shown in FIG. 1. Moreover, the power supply control device 12A is built so as to be able to control each of the power units 14-1, 14-2, . . . 14-n independently and asynchronously from the other power units, so as also to perform control so as to be able to operate each of the ignition circuits 19-1, 19-2, . . . 19-m independently from the other ones of these ignition circuits, and also so as to be able to perform control of the allocation circuit (splitter) 22 so as to supply an electrical current of any desired intensity to each of the plasma torches 20-1, 20-2, . . . 20-m and so as to allocate the ignition circuits 19-1, 19-2, . . . 19-m.

With this structure, according to the control of the power supply control device 12A, for example, it is possible, along with allocating the first ignition circuit 19-1 to the first plasma torch 20-1, to supply that first plasma torch 20-1 with an electrical current of 50 A from the first power unit 14-1, and moreover, along with allocating the second ignition circuit 19-2 to the second plasma torch 20-2, to supply that second plasma torch 20-2 with an electrical current of 100 A from the second power unit 14-2; and furthermore it is possible to change the method of distribution of the electrical currents to the plurality of plasma torches 20-1, 20-2, . . . 20-m and the method of allocating the ignition circuits to the plasma torches, if a fault should develop in any one of the power units or ignition circuits, and according to the conditions under which each of the plasma torches is operating (such as the nature of the material to be cut and the plate thickness thereof).

By doing this, when simultaneously performing several cutting tasks using the plurality of plasma torches 20-1, 20-2, . . . 20-m under different conditions, or under the same conditions, it is possible to perform control of the operation of the plasma cutter power supply device 6A in a flexible manner.

As has been explained above, according to the plasma cutter of the present invention, it is possible to perform a cutting task with the plasma cutter power supply device operating at its optimum capacity, and to change the number of the power units which are operated or their output electrical currents, according to the intensity of the plasma electrical current which is required. Moreover, even if a fault should develop in one of the power units, it is possible to continue the operation of the plasma cutter within the range of cutting conditions (nature of the material to be cut, plate thickness thereof, and cutting speed) which can be supported by the other power units which are functioning normally. Furthermore, it is possible to operate the plurality of power units which make up this plasma cutter power supply device mutually independently without any need for them to be synchronized.

Yet further, according to the plasma cutter of the present invention, since it is possible to divide up the main circuit of the plasma cutter power supply device into the plurality of power units, accordingly it is possible to house these separated power units in the interior of a table of the plasma cutter, upon a shift trolley which carries the plasma torch, in the interior of a rail unit along which that trolley shifts, in a space between the rail unit and the table, or the like. By doing this, if the plasma cutter power supply device is installed in the main body of the plasma cutter in this manner, then it becomes unnecessary to provide a large sized plasma cutter power supply device which is installed in a location separate from the main body of the plasma cutter as in the prior art, and moreover it also becomes unnecessary to extend a large number of trailing cables upon the floor between the plasma cutter power supply device and the plasma cutter main body, so that the working space in the workplace can be utilized more effectively, and thereby the ease of working is further facilitated.

Although various embodiments of the present invention have been described above, these are only given for the purposes of explanation of the present invention, and are not to be considered as being limitative of the scope of the present invention in any way. Provided that the gist of the present invention is not departed from, it would be possible to implement the present invention in various manners other than those shown in the above described embodiments.

What is claimed is:

1. A plasma cutter comprising:

a plasma torch;

a plasma cutter power supply device which comprises a plurality of power units capable of supplying electrical current to the plasma torch in parallel;

a power supply control device that controls (1) how many among the plurality of power units are to be operated and/or (2) an intensity of output electrical current of each of the power units which is being operated; and a component that simultaneously detects actual values of output currents of the power units, wherein the power supply control device comprises:

a component that identifies at least one of (1) a number of faulty power units and (2) a number of operational power units within the plurality of power units by comparing the respective actual values with a command value of an electrical current;

a component that selects and turns on selected power units of the operational power units based on (1) the number of faulty power units and (2) the number of operational power units within the plurality of power units;

a component that determines, according to cutting conditions, an intensity of electrical current required for operating the plasma torch; and a component which adjusts a respective intensity of the selected power units according to the number of faulty power units and the determined intensity of electrical current required for operating the plasma torch.

2. The plasma cutter as described in claim 1, wherein the power supply control device further comprises:

a component that decides whether or not cutting can be executed, based upon the number of faulty power units and based upon the cutting conditions; and a component that cancels an execution of cutting, if it has been decided that it is not possible to execute cutting.

3. The plasma cutter as described in claim 1, wherein each of the plurality of power units is capable of operating asynchronously and independently of others of the power units.

4. The plasma cutter as described in claim 1, comprising:

a plurality of plasma torches; and a splitter which allocates the output electrical current of the plurality of power units to the plurality of plasma torches;

and wherein the power supply control device controls an intensity of the electrical current allocated by the splitter to each of the plurality of plasma torches, according to the cutting conditions for each of the plasma torches.

5. The plasma cutter as described in claim 1, comprising:

a plurality of plasma torches;

a plurality of ignition circuits; and a splitter which allocates the plurality of ignition circuits to the plurality of power units.

6. A plasma cutter power supply system which supplies plasma electrical current to a plasma torch, comprising:

a plasma cutter power supply device which comprises a plurality of power units capable of supplying electrical current to the plasma torch in parallel; and a power supply control device that controls how many among the plurality of power units are to be operated, and/or an intensity of the output electrical current of each of the power units which is being operated, according to cutting conditions;

a component that simultaneously detects actual values of output currents of the power units, wherein the power supply control device comprises:

a component that determines an intensity of electrical current required for the plasma torch according to the cutting conditions; and a component that determines and selects, by comparing the respective actual values with a command value of an electrical current and according to the determined intensity of the required electrical current, at least one of (1) how many among the plurality of power units are operated and (2) an operating intensity of the output electrical current of each of the power units that is operating.

* * * * *